(No Model.)
H. CHADWICK.
COOKING UTENSIL.
No. 426,240. Patented Apr. 22, 1890.
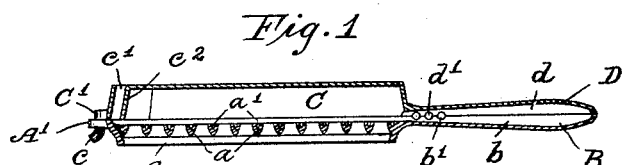
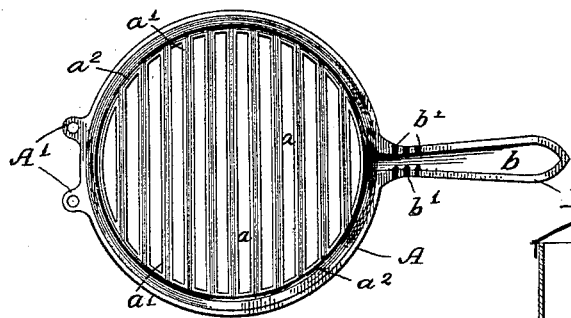
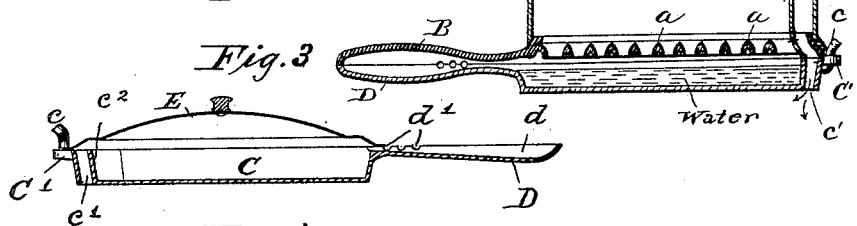
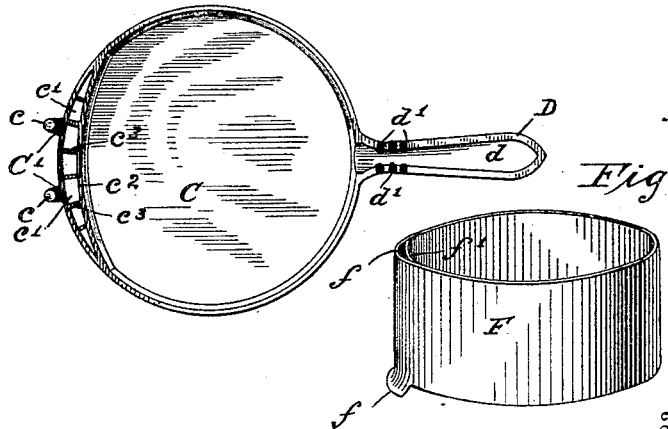
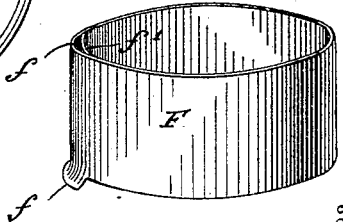
Witnesses
A. M. Johnson
W. B. Howe
Inventor
Hale Chadwick
By his Attorney J. B. Thurston

UNITED STATES PATENT OFFICE.

HALE CHADWICK, OF PENACOOK, NEW HAMPSHIRE.

COOKING UTENSIL.

SPECIFICATION forming part of Letters Patent No. 426,240, dated April 22, 1890.

Application filed March 15, 1889. Serial No. 303,364. (No model.)

*To all whom it may concern:*

Be it known that I, HALE CHADWICK, a citizen of the United States, residing at Penacook, in the county of Merrimac and State of New Hampshire, have invented certain new and useful Improvements in Cooking Utensils, of which the following is a specification.

This invention relates to cooking utensils adapted for stewing, frying, broiling, steaming, or toasting various articles of food, the object of the invention being to accomplish the foregoing with a utensil combining as few parts as possible, and to provide means whereby all the odor produced by various articles being cooked shall pass into the stove or range and pass with the products of combustion into the smoke-flue.

The invention consists of the combination of the various parts as hereinafter described and set forth in the following specification and claims, and clearly illustrated in the accompanying drawings, forming an inseparable part thereof, of which—

Figure 1 represents the broiler or toaster provided with an extraordinary deep cover, which may be inverted and utilized as a frying-pan, both being shown in section. Fig. 2 is a detached plan view of the broiler or toaster. Fig. 3 is a detached sectional view of the cover for the broiler (upon which is placed a suitable tin cover) ready for use as a frying-pan. Fig. 4 is a detached inverted plan view of the said broiler-cover; and Fig. 5 is a perspective view of a bottomless cylinder, which, when used in connection with the broiler and its cover (both inverted) and an ordinary tin cover upon the top of the said cylinder, comprises an excellent vessel for steaming various articles of food. Fig. 6 is a sectional view of the above-mentioned parts assembled.

Similar letters indicate like parts throughout the various views.

A represents a broiler, the bars $a$ of which each contain a groove $a'$, connecting with an annular groove $a^2$, all in the top of said broiler. One or more ears $A'$ are provided upon said broiler, having each a perforation, as shown best in Fig. 2. Diametrically opposite to said ears $A'$ projects a hollow handle B, its hollow portion $b$ terminating near the annular groove $a^2$. In the upper edge of said handle B slots $b'$ may be formed, for a purpose to be hereinafter explained.

The cover C may be substantially of the form shown in Figs. 1, 3, and 4 and provided with lugs $C'$, having studs $c$ projecting downward therefrom and adapted to enter the perforated ears $A'$ of the broiler A. An opening $c'$ is formed through the top of said cover by means of a partition $c^2$ through a segment of the circle of said cover and connected to the outside wall by several radial partitions or grates $c^3$. Diametrically opposite to the lugs $C'$ and said grated opening $c'$ projects a handle D, having a hollow portion $d$, slotted at either side, as at $d'$.

When the broiler A and cover C are placed one upon the other and connected by means of the perforated ears and studs, as seen in Fig. 1, their respective handles are caused to fit each other, hollow sides to their slots $b'$ $d'$ exactly coinciding and forming openings connecting with the air-chamber formed by the hollow portions $b$ $d$ of each handle B D. By this construction the air of a room is drawn (by reason of the draft caused by the fire in the stove or range) through the grated opening $c'$ and the slots in the hollow handles downward through the broiling-iron A, and, together with the more or less offensive odors, fumes, and smoke from the meat or other food in process of cooking, is carried out through the smoke-flue with the products of combustion. Likewise, when using said cover C as a cooking utensil for frying or stewing articles of food, an ordinary tin cover E, placed thereon as in Fig. 3, will perform the same office for it that said cover C does for the broiler A, the air of the room being drawn through the hollow portion $d$ of the handle D under said tin cover E, and mingling with the steam and odors contained therein passes downward through the grated opening $c'$, and thence out with the products of combustion into the smoke-flue or chimney.

For steaming vegetables and the like the cylinder F, which is formed open at both ends, and preferably provided with a passage or chamber $f$, which in the drawings I show interiorly, and formed by means of the partition $f'$, is placed upon the broiler A, which rests upon the inverted cover C, containing water, and an ordinary tin cover E is placed upon said cylinder F. The articles to be steamed, being placed within said cylinder F, are kept from contact with the water in the pan or (inverted) cover C by the broiler A, upon which they rest, and the steam and odor contained in the cylinder F are drawn through the passage $f$ (care being taken to place the latter over the grated opening of the cover C) and the grated opening $c'$ of the (inverted) cover C, and mingling with the products of combustion pass out by means of the smoke-flue to the chimney. Thus with my improved utensil all cooking which is performed directly over the fire, or upon the top of a stove or range, may be conducted without the usual escape of steam, the various odors, or smoke from the articles being cooked in the house.

Having described my improvements, what I claim, and desire to secure by Letters Patent, is—

1. In a cooking utensil, the combination of a shallow vessel having a handle hollowed on its top and slotted in its edges and provided with a grated air-passage at one side, a grated cover adapted to rest upon said vessel and having a handle hollowed out on its bottom and slotted, as shown, and a cylinder formed open at both ends and adapted to fit upon said grated cover, provided with an air-passage connecting with the passage in said shallow vessel, and a suitable cover for said cylinder, all substantially for the purpose set forth.

2. In a cooking utensil, the combination of a broiler provided with bars and having a handle B, a pan having a handle D, a partition $c^2$, cutting off a bottomless portion of said pan and fitting said broiler, a bottomless cylinder F, fitting said broiler and having a partition $f'$, and a cover, substantially as set forth.

3. In a cooking utensil, the combination of a broiler having bars and a pan having a partition $c^2$, cutting off a bottomless portion of said pan and fitting said broiler, substantially as set forth.

4. In a cooking utensil, the combination of a broiler, provided with bars and having a handle B, and a pan having a handle D, a partition $c^2$ cutting off a bottomless portion of said pan and fitting said broiler, substantially as set forth.

In testimony whereof I affix my signature in presence of two witnesses.

HALE CHADWICK.

Witnesses:
J. B. THURSTON,
NATHANIEL E. MARTIN.